(12) United States Patent
Henocq et al.

(10) Patent No.: US 8,824,566 B2
(45) Date of Patent: Sep. 2, 2014

(54) METHOD AND APPARATUS FOR RECEIVING IMAGES HAVING UNDERGONE LOSSES DURING TRANSMISSION

(75) Inventors: Xavier Henocq, Mouaze (FR); Eric Nassor, Thorigne Fouillard (FR)

(73) Assignee: Canon Kabushiki Kaisha, Tokyo (JP)

( * ) Notice: Subject to any disclaimer, the term of this patent is extended or adjusted under 35 U.S.C. 154(b) by 1661 days.

(21) Appl. No.: 11/683,323

(22) Filed: Mar. 7, 2007

(65) Prior Publication Data

US 2007/0211799 A1    Sep. 13, 2007

(30) Foreign Application Priority Data

Mar. 8, 2006    (FR) ..................................... 06 50802

(51) Int. Cl.
| | |
|---|---|
| *H04N 7/12* | (2006.01) |
| *H04N 21/4363* | (2011.01) |
| *H04N 21/2381* | (2011.01) |
| *H04N 21/61* | (2011.01) |
| *H04N 7/68* | (2006.01) |
| *H04N 21/438* | (2011.01) |

(52) U.S. Cl.
CPC ........... *H04N 7/68* (2013.01); *H04N 21/43637* (2013.01); *H04N 21/2381* (2013.01); *H04N 21/6131* (2013.01); *H04N 21/4381* (2013.01); *H04N 21/4363* (2013.01)
USPC ............ 375/240.27; 375/240.16; 375/240.25; 375/240.26; 375/240.28; 375/240.29; 382/236; 382/252

(58) Field of Classification Search
None
See application file for complete search history.

(56) References Cited

U.S. PATENT DOCUMENTS

| | | | | |
|---|---|---|---|---|
| 5,247,363 A | * | 9/1993 | Sun et al. ....................... | 348/616 |
| 5,727,088 A | * | 3/1998 | Kim .............................. | 382/238 |

(Continued)

FOREIGN PATENT DOCUMENTS

| | | |
|---|---|---|
| EP | 1 137 005 A2 | 9/2001 |
| EP | 1 608 182 A2 | 12/2005 |

OTHER PUBLICATIONS

Myeong-Hoon et al., "Error Concealment for MPEG-2 video decoders with enhanced coding mode estimation," IEEE Transactions on Consumer Electronics, vol. 46, No. 4, Nov. 2000, pp. 962-969.*

(Continued)

*Primary Examiner* — Luu Pham
*Assistant Examiner* — Canh Le
(74) *Attorney, Agent, or Firm* — Fitzpatrick, Cella, Harper & Scinto (57) ABSTRACT

The reception method is implemented in a receiver apparatus receiving images of a video sequence having undergone losses during an exchange of data with a sender apparatus connected to said receiver apparatus via a communication network. The receiver apparatus comprises at least a first module implementing a transport layer and a second module implementing an application layer, the application layer being subdivided into a first sub-module implementing the decoding of the video and a second sub-module implementing the display of said video. The method comprises the following steps:
  in the transport layer, transmitting a data loss detection signal intended for the application layer, as soon as the transport layer detects a loss of data; and
  in the application layer, implementing a loss concealment mechanism, on reception of said loss detection signal and without waiting for said application layer itself to detect said data loss so detected.

14 Claims, 4 Drawing Sheets

(56) References Cited

U.S. PATENT DOCUMENTS

| | | | |
|---|---|---|---|
| 6,449,311 B1* | 9/2002 | Ozcelik et al. | 375/240.16 |
| 6,665,345 B1* | 12/2003 | Sekiguchi et al. | 375/240.25 |
| 6,876,705 B2* | 4/2005 | Katsavounidis et al. | 375/240.28 |
| 6,990,151 B2* | 1/2006 | Kim et al. | 375/240.27 |
| 2003/0026343 A1* | 2/2003 | Kim et al. | 375/240.27 |
| 2004/0139462 A1* | 7/2004 | Hannuksela et al. | 725/32 |
| 2005/0104887 A1 | 5/2005 | Henocq et al. | 345/473 |
| 2005/0105625 A1* | 5/2005 | Kim et al. | 375/240.27 |
| 2005/0182996 A1* | 8/2005 | Bruhn | 714/752 |
| 2005/0254584 A1* | 11/2005 | Kim et al. | 375/240.27 |
| 2005/0280704 A1 | 12/2005 | Clare et al. | 348/143 |
| 2006/0045190 A1* | 3/2006 | Sun et al. | 375/240.27 |
| 2006/0104366 A1* | 5/2006 | Huang et al. | 375/240.27 |
| 2006/0171475 A1* | 8/2006 | Kwon et al. | 375/240.27 |
| 2006/0215761 A1* | 9/2006 | Shi et al. | 375/240.16 |
| 2006/0282737 A1* | 12/2006 | Shi et al. | 714/746 |
| 2007/0288651 A1 | 12/2007 | Nassor et al. | 709/231 |

OTHER PUBLICATIONS

Maja Bystrom et al. "Hybrid Error Concealment Schemes for Broadcast Video Transmission over ATM Networks," IEEE Transactions on Circuits and systems for Video Techmology, vol. 9, No. 6, Sep. 1999, pp. 868-881.*

French Search Report dated Dec. 21, 2006, issued in counterpart application FR 0650802.

* cited by examiner

METHOD AND APPARATUS FOR RECEIVING IMAGES HAVING UNDERGONE LOSSES DURING TRANSMISSION

BACKGROUND OF THE INVENTION

The present invention relates to the processing of data and more particularly to the concealment of data losses during an exchange of data between a sender apparatus and a receiver apparatus connected together via a communication network.

It has an application in the field of video transmission over a wireless communication network.

It concerns, without limitation thereto, domestic applications from a sender apparatus to a receiver apparatus.

In practice, the sender and receiver apparatuses are potentially mobile embedded systems. The sender apparatus has storage capacities which enable it to store videos after their acquisition and their compression. Once stored, a user may request to view the videos on a viewing receiver apparatus. For this, a wireless connection is created between the sender apparatus and the receiver apparatus. A first exchange of items of information between the sender apparatus and the receiver apparatus enables the receiver apparatus to know the nature of said receiver apparatus, its capacities and the wishes of the user. These first items of information may describe the receiver apparatus in terms of calculation, display and decoding capacities. Second items of information are then exchanged during the transmission. In contrast to the first series of items of information, these second items of information will be regularly updated. They describe in particular the evolution of the state of the network from the point of view of the receiver apparatus. The analysis of these second items of information may incite the receiver apparatus to adapt the video.

In practice, the adaptation of the video is efficacious only in case of a stable state of the communication network between the sender apparatus and the receiver apparatus. This adaptation does not enable periods of transition between two states to be dealt with. When for example the capacities of the network decrease, losses occur for as long as the sender apparatus has not been alerted of the change.

Conventionally, the OSI ("Open Systems Interconnection") model defined by the ISO ("International Standards Organization") presents communication systems in the form of the following seven layers:
- the physical layer which takes care of the bit transmission over a communication medium;
- the data link layer which takes care of a communication medium in order to make it appear to the network layer as being exempt from transmission errors;
- the network layer which takes care of the routing of the data between sub-networks;
- the transport layer which takes care of the data of the session layer, cuts it up if necessary into smaller units and ensures that all the pieces arrive properly at the receiver;
- the session layer the object of which is to provide advanced services to the transport layer (such as the synchronization of the communicating systems, the management of bi- or mono-directional sessions);
- the presentation layer which focuses on the syntax and semantics of the data transmitted. It ensures that the data transmitted is understood on each side of the communicating system; and
- the application layer which implements all the imaginable applications of a communicating system (transfer, viewing of files, etc.).

This representation is purely theoretical since, in reality, it is possible for a communicating system not to implement one of the layers.

Generally, in a client/server application transmitting video, it can be considered that the client device is constituted by three main elements implementing the operations of the transport layer and of the application layer. These three elements are a first unit for receiving packets belonging to the transport layer, and a second unit for decoding and a third unit for display, which belong to the application layer. The units for reception and decoding share a storage unit for the content of the packets. The decoding and display units share a unit for storage of the decoded images.

The content of the packet storage unit is in general ahead with respect to that of the decoded image storage unit. In other words, the transport layer stores several images not yet having been decoded by the decoder.

In general, the transport and application layers exchange little or no information. At best, the transport layer indicates that a loss has occurred and the position of that loss. This avoids the decoder desynchronizing when it gets to the position of that loss.

In the document U.S. Pat. No. 5,247,363 a method is provided in which, when an error is detected in the image in course of decoding, the temporal and spatial activities of the sequence are calculated, using the only images available, that is to say the current image and the reference image. The two activities are then compared in order to select a method of loss concealment. It is thus impossible to increase the precision of the calculations of the spatial and temporal activities by increasing the number of images analyzed.

A similar method focusing on bi-predicted B images is proposed in document U.S. Pat. No. 5,727,088. Here too, the decoder only commences a method of concealing losses at the time of the decoding of the current image. The decoder then uses the only available images to detect changes of scene and to determine how the loss of a macroblock should be concealed.

A simpler method of selecting a method of loss concealment is proposed in document U.S. Pat. No. 6,449,311. In this method, the decoder keeps information describing the continuity of motion. In case of losses, the motion continuity is tested here in order to determine whether the concealment should use spatial or temporal interpolation. Here, the motion information is calculated and kept continuously. No information from the transport layer is used.

A similar concept testing motion continuity for determining whether a motion vector should be used is described in the document U.S. Pat. No. 6,665,345.

The Applicant set itself the problem of providing a method of selecting the method the best adapted to the loss of information at a video receiver apparatus.

SUMMARY OF THE INVENTION

A solution to this problem is precisely what the present invention provides.

It is directed to a procedure for concealment method selection based on the anticipation of the losses by the decoder by virtue of the obtainment of information from the transport layer.

Thus, it relates to a reception method implemented in a receiver apparatus receiving images of a video sequence having undergone losses during an exchange of data with a sender apparatus connected to said receiver apparatus via a communication network, the receiver apparatus comprising at least a first module implementing a transport layer and a second module implementing an application layer, the application layer being subdivided into two sub-modules, the first implementing the decoding of the video and the second implementing the display of said video.

According to a general definition of the invention, the method comprises the following steps:

in the transport layer, transmitting a data loss detection signal intended for the application layer, as soon as the transport layer detects a loss of data; and in the application layer, implementing a loss concealment mechanism on reception of said detection signal so received and without waiting for the application layer itself to detect said data loss so detected.

Thus, according to the method in accordance with the invention, the transport layer informs the application layer that a loss has occurred as soon as the latter is detected. The application layer then commences a loss concealment method without waiting for the erroneous image to be in course of decoding.

In practice, the loss concealment mechanism commences with the storage of motion information from each image preceding the error tainted image starting with the image following the reception of the detection signal.

Preferably, the method further comprises determining the nature of the motion by an analysis of the motion information so stored.

The decoder then commences an analysis of all the images contained in the packet storage unit up to the error tainted image. This preliminary analysis makes it possible to obtain more precise information on the characteristics of the sequence than the methods of the prior art. This is because the number of images analyzed is increased. This analysis makes it possible both to decide whether the implementation of a loss concealment method is possible and to choose the best method among a set of concealment methods. In practice, the analysis of the motion information takes into account the norms of the difference vectors between the vector of a current macroblock and the vectors of the macroblocks of the neighborhood.

If it is not possible to conceal the losses, a method is applied of progressive obscuring of the image, also termed fading. Indeed, it is more pleasant for the user to see fading of the sequence in case of errors and to display nothing until the sequence has been resynchronized, rather than to have an abrupt disruption in quality and to display incorrectly decoded images.

The present invention also relates to a receiver apparatus receiving images of a video sequence having undergone losses during an exchange of data with a sender apparatus connected to said receiver apparatus via a communication network, the receiver apparatus comprising at least a first module implementing a transport layer and a second module implementing an application layer, the application layer being subdivided into a first sub-module implementing the decoding of the video and a second sub-module implementing the display of said video.

According to another aspect of the invention, the apparatus comprises:

in the transport layer, means for transmitting a data loss detection signal intended for the application layer, as soon as the transport layer detects a loss of data; and in the application layer, a loss concealment mechanism adapted to implement, on reception of said loss detection signal and without waiting for said application layer itself to detect said data loss so detected.

In practice, said loss concealment mechanism comprises means for the storage of motion information from each image preceding the error tainted image starting with the image following the reception of the detection signal.

According to one embodiment, the apparatus further comprises means for determining the nature of the motion by an analysis of the motion information stored. In practice, the means for analysis of the motion information take into account the norms of the difference vectors between the vector of a current macroblock and the vectors of the macroblocks of the neighborhood.

According to another embodiment, in response to motion that is considered to be regular, the loss concealment mechanism is adapted to choose a method among a set of methods available at the receiver apparatus, or a process of fading the image.

The present invention also relates to an information carrier readable by a computer system, possibly wholly or partly removable, in particular a CD-ROM or magnetic medium, such as a hard disk or a diskette, or a transmissible medium, such as an electrical or optical signal, characterized in that it comprises instructions of a computer program enabling the implementation of the method mentioned above, when that program is loaded and executed by a computer system.

Finally, the present invention relates to a computer program stored on an information carrier, said program comprising instructions enabling the implementation of the method mentioned above, when that program is loaded and executed by a computer system.

Other features and advantages of the invention will appear in the light of the following description and drawings.

DETAILED DESCRIPTION OF THE INVENTION

The present invention has a particular application in a video transmission system between a sender apparatus and a receiver apparatus. The sender apparatus is for example an embedded system, such as a stills camera, a video camera or a personal assistant having a wireless transmission capability such as a card compatible with the IEEE802.11 a, b or g protocol, and storage, calculation and coding capabilities in accordance with the MPEG-4 standard. As for the receiver apparatus, this is a display apparatus, such as a television, having reception capabilities such as a card compatible with the same protocol as the sender, and calculation, storage and decoding capacities in accordance with the MPEG-4 standard. Obviously, the invention also operates in a non-embedded system and/or on a wired network. The sender apparatus and the receiver apparatus use protocols, such as the RTP, UDP or IP protocols to communicate.

In what follows in the description, only the receiver apparatus is concerned. This is because the sender apparatus has no active role here and merely continuously sends a video.

Figure 1:
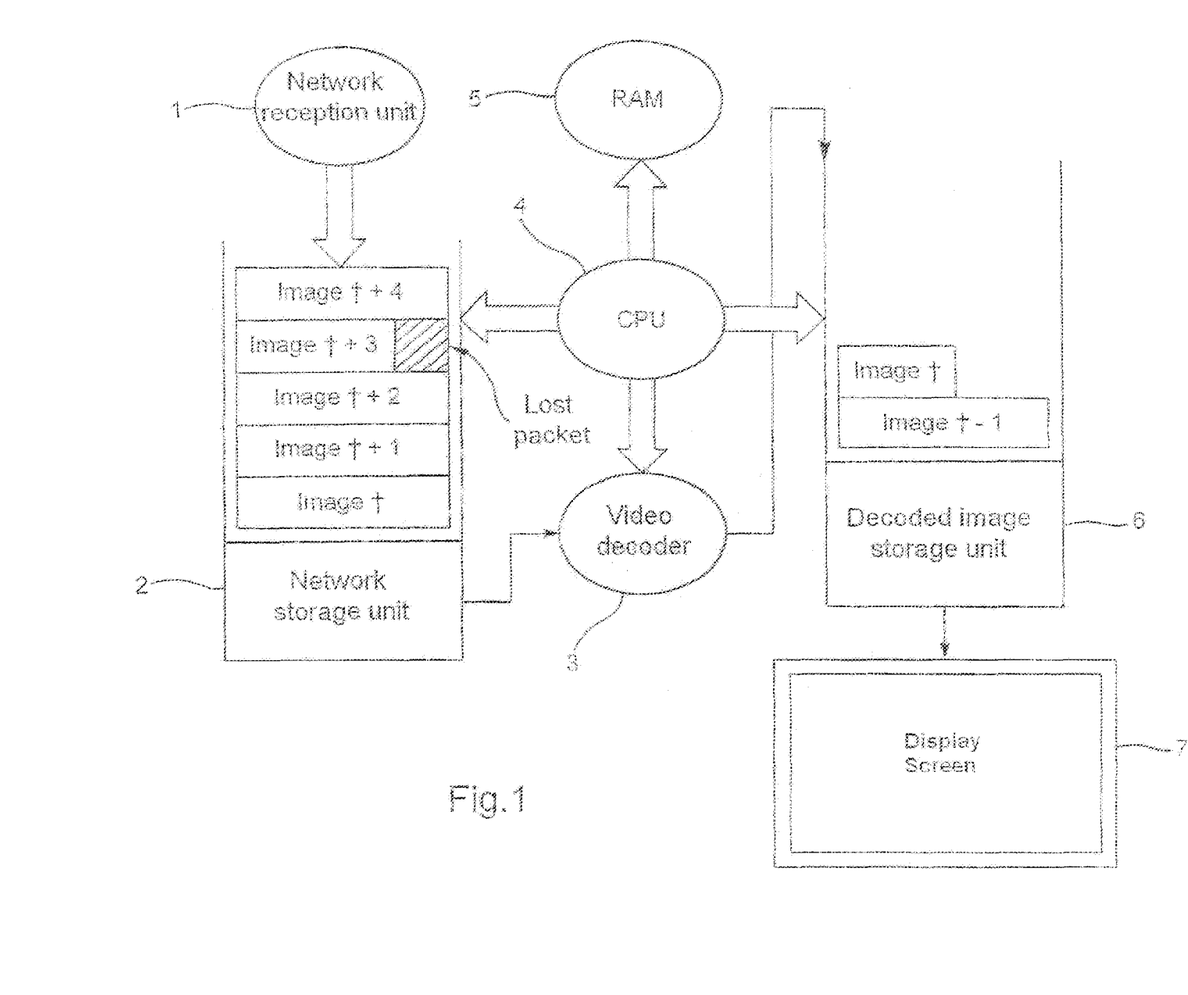
FIG. 1 is a diagram of a receiver apparatus according to the invention.

With reference to FIG. 1, the constitutive and essential elements of a receiver apparatus have been represented.

The receiver apparatus comprises a network reception unit 1 capable of receiving the packets transmitted by the sender apparatus via a communication network (not shown). A network storage unit 2 stores the content of the packets so received. The receiver apparatus further comprises a video decoder 3, a calculation unit CPU 4, a random access memory RAM 5, a decoded image storage unit 6 and a display screen 7.

The receiver apparatus is for example a micro-computer connected to different peripherals such as a hard disk and a diskette drive. The diskette like the disk can contain data processed according to the invention as well as the code of the invention which, once read by the central processing unit 4, will be stored on the hard disk.

As a variant, the program enabling the device to implement the invention can be stored in read only memory (not shown).

In a second variant, the program can be received in order to be stored in an identical manner to that described previously via the communication network (not shown). The central processing unit 4 (referred to as CPU in the drawing) will execute the instructions relating to the implementation of the invention, which are stored in the read only memory (not shown) or in the other storage means. On powering up, the decompression programs stored in a non-volatile memory are transferred into the random-access memory RAM 5, which will then contain the executable code of the invention, as well as registers for storing the variables necessary for implementing the invention. Naturally, the diskettes may be replaced by any form of information carrier such as CD-ROM, or memory card. In more general terms, an information storage means, which can be read by a computer or microprocessor, integrated or not into the receiver apparatus, and which may possibly be removable, stores a program implementing the method according to the invention With reference to FIGS. 2 and 3, the receiver apparatus implements two processes operating in parallel and communicating by signals. The first process is the reception process and is described by the steps S201 to S203 The second process is the decoding process and is described by the steps S211 to S231. It may be noted that these two processes respectively implement the transport layer and the application layer.

Figure 2:
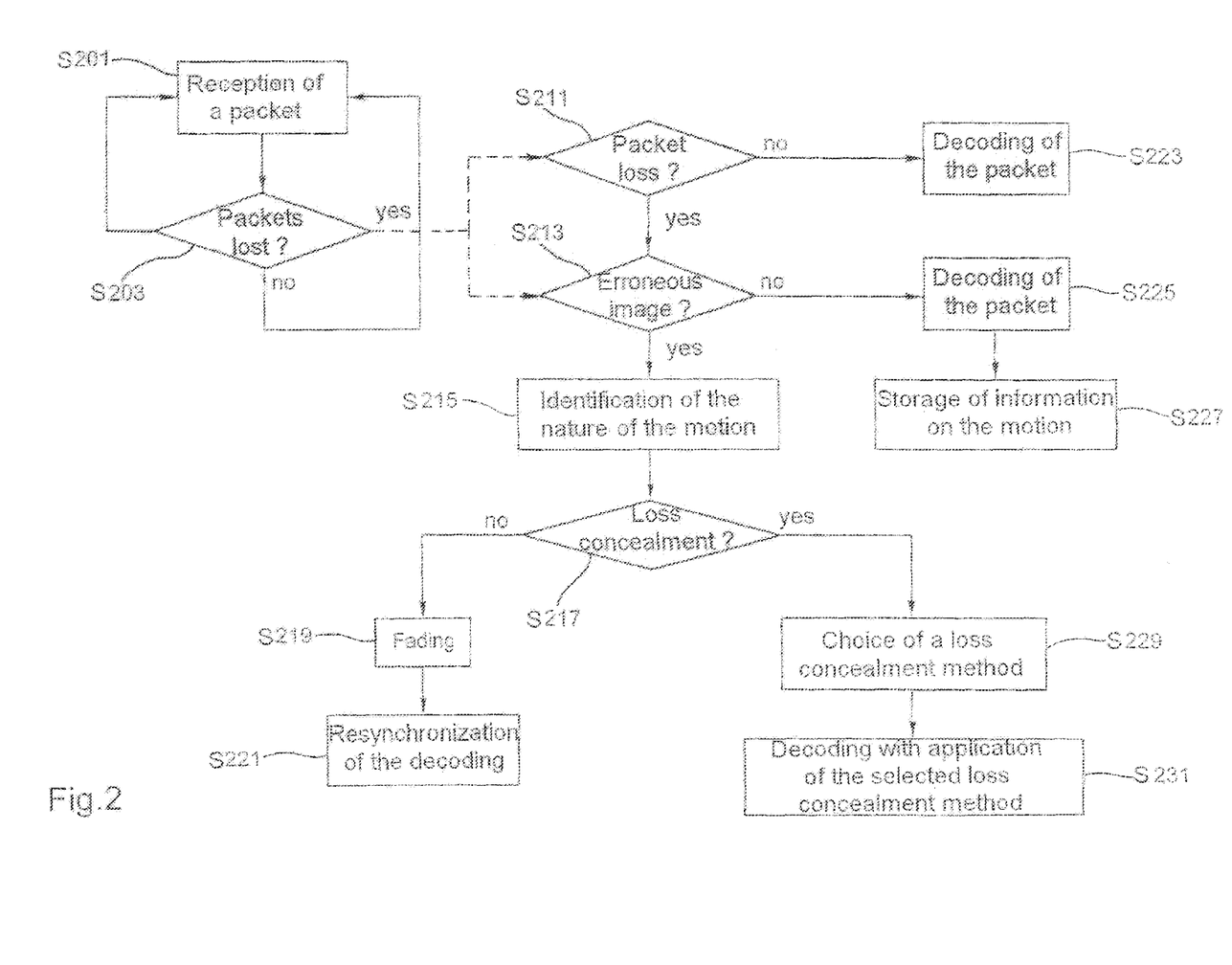
FIG. 2 is a flowchart illustrating the operation of the receiver apparatus according to the invention.

The reception process commences at step S201 by the reception of an RTP packet. This packet is stored in the network storage unit 2 until its content has been used up by the application layer. It is then erased. The header of these packets contains two items of information enabling the image number contained by the packet to be identified:

a unique sequence number (sequence number) identifying each packet and incremented by 1 with each packet sent;

a timestamp (timestamp). It is assumed here that the coder controls this identifier and that it is incremented by the value of the temporal separation between two images for each new image sent. If for example the sequence is played at 25 images per second, the separation is $\delta=0.04$ s. Note that if an image is transmitted in several packets, these have the same timestamp.

At step S203, the reception unit 1 sends these two indicators to the calculation unit 4.

Figure 3:
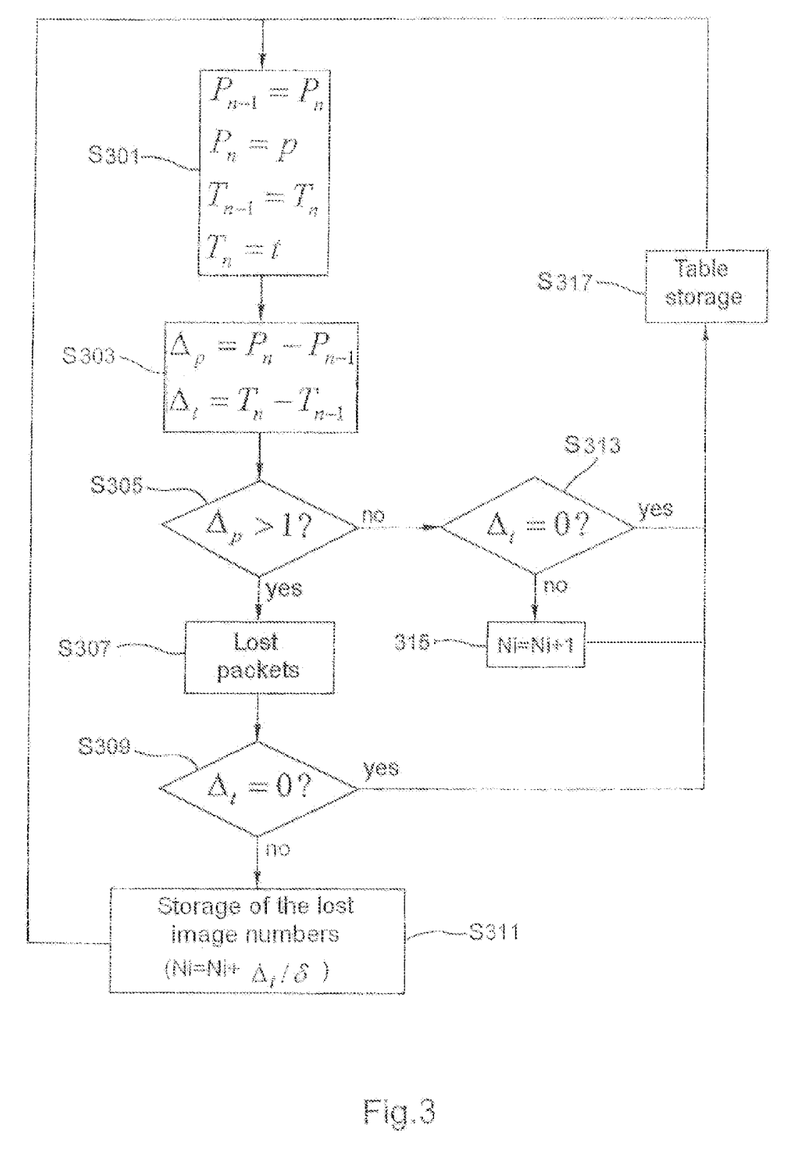
FIG. 3 is a flowchart illustrating the operation of the calculation unit of the receiver apparatus according to the invention.

The details of the processes carried out by the calculation unit 4 are described with reference to FIG. 3. At step S301, the calculation unit 4 stores in random access memory 5:

the sequence number of the last packet received $P_n$;
the sequence number of the previous packet received $P_{n-1}$;
the timestamp of the last packet received $T_n$; and
the timestamp of the previous packet received $T_{n-1}$.

Next calculation is made at step S303 of the difference between the sequence numbers to obtain a numerical delta $\Delta_p$ and the timestamps to obtain a time delta $\Delta_t$. The value of the numerical delta $\Delta_p$ is tested at step S305. If this is greater than 1, at least one packet has been lost. In this case step S305 is followed by the step S307. During this step a signal is sent to the decoder to indicate to it that at least one packet has been lost. Step S307 is followed by step S309 during which the value of the time delta $\Delta_t$ is verified. If this is equal to 0, a part of the current image has been lost. The image number, the packet number and the "lost" state of the packet are then stored in a table TAB stored in random access memory. If the time delta $\Delta_t$ is different from 0, then the number $\Delta_t/\delta$ of images have undergone losses. At step S311, the numbers of all those images and the state of the packet are stored in the table TAB. The corresponding packet numbers are not noted since it cannot be identified in what packet each image was transported. At step S311 the number Ni is incremented by $\Delta_t/\delta$.

If at step S305, the numerical delta $\Delta_p$ is equal to 1, the step S313 is proceeded to. During this step, the value of the time delta $\Delta_t$ is tested. If this is equal to 0, the last packet received contained a new portion of an image. This step is then followed by the step S317 during which the number of the image received, the number of the packet containing a portion of that image and its received state are stored. If a portion of a new image has been received, the number of the last image received Ni is incremented by 1 during step S315. Next the step S317, described earlier, is proceeded to.

Step S301 is returned to as soon as a new packet is received.

The processes of the application layer are executed in parallel with the process of the transport layer. As soon as the processing of a packet has terminated, the decoder 3 uses up a new packet in the network storage unit 2. This step triggers the processes implemented by the application layer described with reference to FIG. 2. The processes commence with step S211 during which it is tested whether a message has been received indicating that a packet has been detected as "lost". If that is not the case, the content of the packet is decoded and a new packet is used up. If a packet has been detected as "lost", step S211 is followed by step S213. During this step, it is verified whether the image in course of decoding is an erroneous image. For this a search is made in the table TAB for the numbers of the image and of the current packet and its state is verified. If its state is "received", the image in course is not erroneous. Step S225 is then proceeded to during which the decoding is carried out of the content of the packet. This step is followed by the step S227 during which the numbers of the current image and the motion vectors of that image are stored in a table MOUV. If the state of the image is "lost" at step S213, the image is erroneous and step S215 is proceeded to. Note that once the verification of step S215 has been carried out, the data corresponding to that packet are erased from the table TAB. At step S215 the motion analysis is carried out. For this, the cumulative amplitude of the motion vectors is calculated, and the complexity of the motion is determined.

Figure 4:
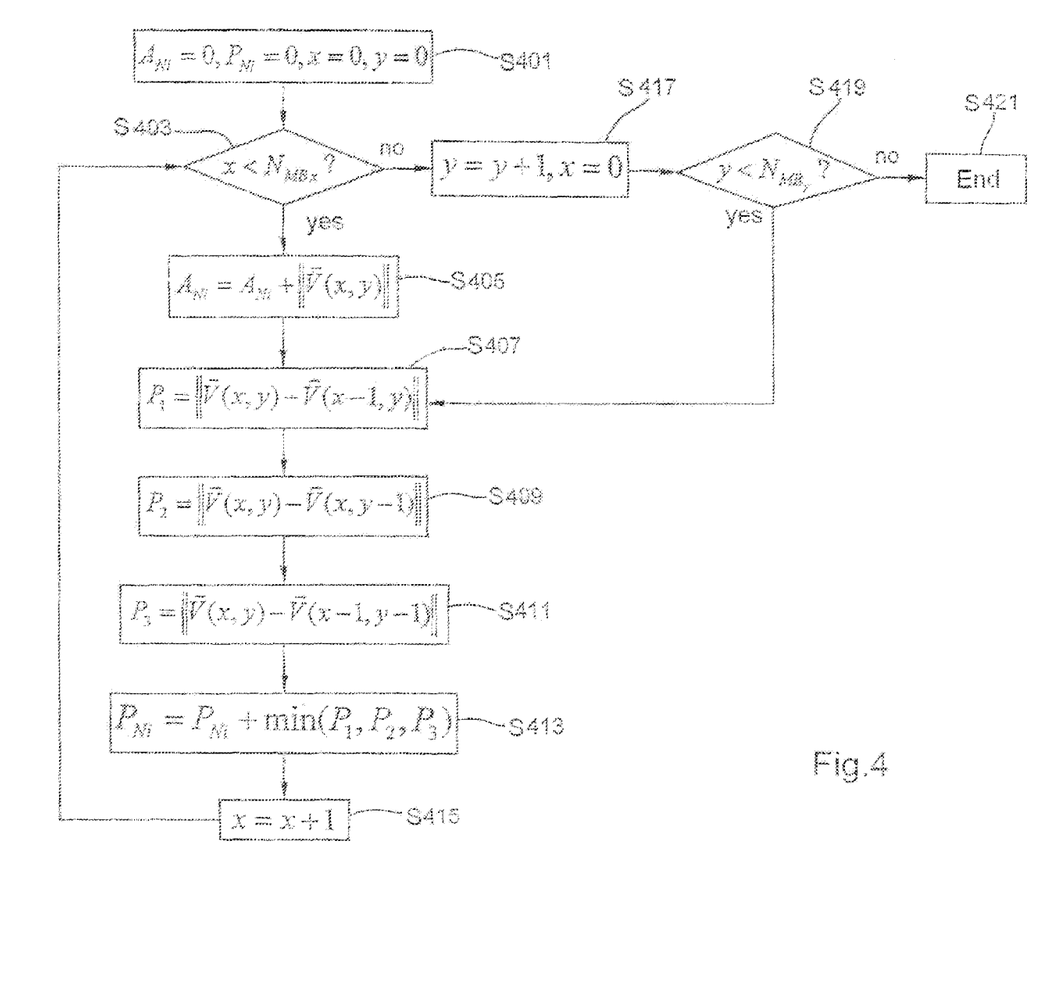
FIG. 4 is a flowchart illustrating the motion analysis procedure according to the invention.

This procedure is described with reference to FIG. 4. It commences at step S401 with the initialization of the variables $A_{Ni}$ (amplitude of the motion in the image Ni), $P_{Ni}$ (cumulative amplitude of the difference in motion between two spatially close macroblocks MB), x, and y to 0. The amplitude $P_{Ni}$ makes it possible to determine the random or regular nature of the motion in the video. This step is followed by the step S403 during which the value of x is compared to the number of macroblocks MB in a row of macroblocks MB of an image. If x is less than that number, step S405 is proceeded to, during which $A_{Ni}$ is incremented by the value of the amplitude of the motion of the current macroblock MB. This step is followed by the steps S407, S409 and S411 during which calculation is made of the norms of the vectors of differences $P_i$ with i going from 1 to 3 between the vector $\vec{V}(x, y)$ of the current macroblock MB and the vectors $\vec{V}$ of the three macroblocks MB of the neighborhood (if these macroblocks MB are present). Here, the macroblocks MB used are the macroblock MB above the current macroblock MB (if it is present), the macroblock MB preceding the current macroblock MB (if it is present) and the macroblock MB above the macroblock MB preceding the current macroblock MB (if it is present). If the macroblocks MB are absent, no difference is calculated.

Note that the norm of the difference between two motion vectors is calculated here on three macroblocks MB, but that this is just an example of implementation. All the macroblocks MB neighboring the macroblock MB analyzed may also be used, or else another sub-set of neighboring macroblocks could be used.

These steps are followed by the step S413 during which the amplitude $P_{Ni}$ is incremented by the minimum of the amplitudes P1, P2 and P3. x is incremented by 1 at step S415. This step is followed by the step S403. If at step S403 the response is no, y is incremented by 1 and x passes to 0. This step is followed by the step S419 during which y is compared to the value of the number of macroblocks MB in a column of macroblocks MB of the image. If y is less than that value, step S405 is proceeded to, otherwise step S419 is proceeded to which terminates the procedure since the entire image has been processed. The operations of FIG. 4 are reiterated on all the images of which motion information has been kept up to the error tainted image. The items of information $P_{Ni}$ and $A_{Ni}$ obtained for each image are kept in a table INFO_IMAGE.

Reference will now be made again to FIG. 2. Step S217 is proceeded to, during which the decision is taken as to whether or not to conceal the losses. For this, the values of the amplitude $P_{Ni}$ are compared to a threshold. This threshold makes it possible to determine whether the motion is considered as random or regular. This threshold may be determined by virtue of training video sequences. If one of the values of the amplitude $P_{Ni}$ kept in the table INFO_IMAGE exceeds the threshold, it is considered that the motion is random and step S219 is proceeded to which performs the obscuring, also termed fading, of the sequence. In practice, the fading procedure consists of obscuring the images of the sequence until a black image is obtained for the error tainted image. For this at the time of the display the luminance of each pixel of each image is divided by $2^n$. n starts at 1 for the first image on which the fading procedure is applied and is incremented by 1 at each new image up to the error tainted image which is replaced by a black image. Alternatively, in another embodiment it can be envisaged to freeze the display on a correct image, while awaiting the following INTRA image enabling the display to be resynchronized.

Step S219 is followed by step S221 during which the decoder is on standby for the next INTRA image in order to resynchronize and thus resume the display of the images.

If at step S217 it is decided to implement loss concealment, step S229 is proceeded to. During this step, a loss concealment method is chosen from a set of methods available at the receiver.

It has been known since step S217 that the motion in the sequence is relatively regular. By virtue of the motion amplitude information it is possible to determine whether the motion is strong or weak.

Weak and regular motion means that there are long-term correlations between the motions of the macroblocks MB of a series of successive images. Strong and regular motion means that there are short-term correlations between the macroblocks MB of a series of successive images.

A sequence having strong motion is defined as a sequence of which the majority of the images have a value of $A_{Ni}$ greater than a threshold. This threshold may be defined by virtue of training sequences.

The motion vector of a "lost" macroblock MB is predicted on the basis of the motion vector of the best predictor macroblock MB taken from among its closest neighbors.

To determine the best predictor, the motion information of the preceding images kept in the table MOUV is used. For each macroblock MB situated at the same spatial position as the "lost" macroblock MB in the preceding images, the best predictor is determined. The best predictor for a given macroblock MB is the macroblock MB of the neighborhood having the closest motion vector to the motion vector of that macroblock MB.

If the motion is strong, the "lost" macroblock MB is attributed the motion vector of the macroblock MB situated at the same spatial position as the best predictor of the preceding image (short term temporal correlation taken into account).

If the motion is weak, the "lost" macroblock MB is attributed a motion vector obtained by a linear combination of the best predictors taken from all the images of which the motion information has been kept (long term temporal correlation taken into account).

Once the concealment method has been chosen, step S231 is proceeded to, which carries out the decoding with concealment of the losses. The decoding of another image is then proceeded to.

The invention claimed is:

1. A reception method implemented in a receiver apparatus receiving images of a video sequence having undergone losses during an exchange of data with a sender apparatus connected to the receiver apparatus via a communication network, the receiver apparatus comprising at least a first module implementing a transport layer and a second module implementing an application layer, the application layer being subdivided into a first sub-module implementing the decoding of the video and a second sub-module implementing the display of the video, said method comprising the steps of:

storing, by action of the transport layer, into memory a packet received from the sender apparatus, and transmitting a data loss detection signal directly to the application layer at the moment that the transport layer detects that a packet in an error-tainted image is not received from the sender apparatus;

determining, by action of the application layer, whether the data loss detection signal is received from the transport layer;

implementing a loss concealment mechanism based on information obtained from at least one image from a sequence of images starting with the image following reception of the data loss detection signal and ending with an image preceding the error-tainted image, when it is determined the application layer determines that the data loss detection signal is received, wherein implementing the loss concealment mechanism commences before triggering error-tainted image decoding by retrieval of a packet comprising data of the error-tainted image from the memory; and decoding a packet retrieved from the memory, when the application layer determines that the data loss detection signal is not received.

2. The method according to claim 1, wherein the step of implementing the loss concealment mechanism includes obtaining motion information about the at least one image preceding the error-tainted image.

3. The method according to claim 2, further comprising the step of determining a nature of motion by an analysis of the obtained motion information.

4. The method according to claim 3, wherein the analysis of the obtained motion information takes into account norms of difference vectors between a vector of a current macroblock and vectors of macroblocks in a neighborhood.

5. The method according to any one of claims 3 and 4, wherein
in response to motion that is considered to be regular, the loss concealment mechanism is chosen among a set of methods available at the receiver apparatus, and
in response to motion that is considered to be irregular, the receiver apparatus implements a process of image fading.

6. A receiver apparatus, for receiving images of a video sequence having undergone losses during an exchange of data with a sender apparatus connected to the receiver apparatus via a communication network, with at least a first module implementing a transport layer and a second module implementing an application layer, the application layer being subdivided into a first sub-module implementing the decoding of the video and a second sub-module implementing the display of the video, said receiver apparatus comprising:
a microprocessor; and
a memory for storing computer executable instructions that, when executed by the processor, cause the microprocessor to perform the steps of:
storing, by action of the transport layer, into memory a packet received from the sender apparatus, and transmitting a data loss detection signal directly to the application layer at the moment that the transport layer detects that a packet in an error-tainted image is not received from the sender apparatus;
determining, by action of the application layer, whether the data loss detection signal is received from the transport layer;
implementing a loss concealment mechanism based on information obtained from at least one image from a sequence of images starting with the image following reception of the data loss detection signal and ending with an image preceding the error-tainted image, when it is determined the application layer determines that the data loss detection signal is received, wherein implementing the loss concealment mechanism commences before triggering error-tainted image decoding by retrieval of a packet comprising data of the error-tainted image from the memory; and
decoding a packet retrieved from the memory, when the application layer determines that the data loss detection signal is not received.

7. The receiver apparatus according to claim 6, wherein the step of implementing the loss concealment mechanism includes obtaining motion information about the at least one image preceding the error-tainted image.

8. The receiver apparatus according to claim 7, wherein the microprocessor further carries out the step of determining a nature of motion by an analysis of the obtained motion information.

9. The receiver apparatus according to claim 8, wherein the analysis of the motion information takes into account norms of difference vectors between a vector of a current macroblock and vectors of macroblocks in a neighborhood.

10. The receiver apparatus according to claim 8 or claim 9, wherein
in response to motion that is considered to be regular, the loss concealment mechanism is chosen among a set of loss concealment methods available at the apparatus, and
in response to motion that is considered to be irregular, the apparatus implements a process of image fading.

11. A non-transitory computer-readable storage medium storing a computer-executable program for implementing a method to be executed by a receiver apparatus connected to a communication network, the receiver apparatus receiving images of a video sequence having undergone losses during an exchange of data with a sender apparatus connected to the receiver apparatus via the communication network, the receiver apparatus comprising at least a first module implementing a transport layer and a second module implementing an application layer, the application layer being subdivided into a first sub-module implementing the decoding of the video and a second sub-module implementing the display of the video, the method comprising the steps of:
storing, by action of the transport layer, into memory a packet received from the sender apparatus, and transmitting a data loss detection signal directly to the application layer at the moment that the transport layer detects that a packet in an error-tainted image is not received from the sender apparatus;
determining, by action of the application layer, whether the data loss detection signal is received from the transport layer;
implementing a loss concealment mechanism based on information obtained from at least one image from a sequence of images starting with the image following reception of the data loss detection signal and ending with an image preceding the error-tainted image, when it is determined the application layer determines that the data loss detection signal is received, wherein implementing the loss concealment mechanism commences before triggering error-tainted image decoding by retrieval of a packet comprising data of the error-tainted image from the memory; and
decoding a packet retrieved from the memory, when the application layer determines that the data loss detection signal is not received.

12. The non-transitory computer-readable storage medium according to claim 11, wherein the step of implementing the loss concealment mechanism includes obtaining motion information about the at least one image preceding the error-tainted image.

13. The non-transitory computer-readable storage medium according to claim 11, the method further comprising the step of determining a nature of motion by an analysis of the obtained motion information.

14. The non-transitory computer-readable storage medium according to claim 11, wherein the analysis of the obtained motion information takes into account norms of difference vectors between a vector of a current macroblock and vectors of macroblocks in a neighborhood.

* * * * *